United States Patent [19]
Hill

[11] Patent Number: 5,805,815
[45] Date of Patent: Sep. 8, 1998

[54] METHOD AND APPARATUS FOR PROVIDING INTERIM DATA DISPLAYS WHILE AWAITING RETRIEVAL OF LINKED INFORMATION

[75] Inventor: William Colyer Hill, Montville, N.J.

[73] Assignee: AT&T Corp., Middletown, N.J.

[21] Appl. No.: 574,476

[22] Filed: Dec. 18, 1995

[51] Int. Cl.⁶ .................................................. G06F 13/00
[52] U.S. Cl. ..................................... 395/200.48; 707/501
[58] Field of Search ...................... 395/200.01, 200.02, 395/200.09, 200.11, 200.15, 200.47, 200.48, 200.49; 707/501, 513

[56] References Cited

U.S. PATENT DOCUMENTS

| | | | |
|---|---|---|---|
| 5,572,643 | 11/1996 | Judson | 395/793 |
| 5,579,469 | 11/1996 | Pike | 395/326 |

OTHER PUBLICATIONS

Heylighen, "World Wide Web: a distributed hypermedia paradigm for global networking," IEE/INSPEC Database Updats and Additions (1960–1995) Doc.#1374618, Proceedings SHARE Europe Spring COnference, Apr. 18, 1994, pp. 355–368.

December and Randall, "The World Wide Web Unleased." Sams Publishing, Indianapolis, IN, Chapters 1–5, 7, and 10, Dec. 1995.

Primary Examiner—Mark H. Rinehart

[57] ABSTRACT

In the context of global hypertext, a new solution to the human interface problem of waiting for the content of a next page to arrive and be displayed by a WWW browser. Small amounts of relevant content are stored and maintained in the hyperlinks themselves. This extra content is revealed to users during download wait time. Hypertext links that contain and reveal extra content are called content laden links. By displaying content which is useful and relevant to the user while the next WWW page is being fetched, useless dead time can be turned into productive time and the satisfaction level of the user increased.

39 Claims, 6 Drawing Sheets

METHOD AND APPARATUS FOR PROVIDING INTERIM DATA DISPLAYS WHILE AWAITING RETRIEVAL OF LINKED INFORMATION

TECHNICAL FIELD

The invention relates to a method and apparatus for improving the user interface to the World Wide Web (WWW), and more particularly to a method and apparatus for improving user-to-WWW communications.

DESCRIPTION OF THE PRIOR ART

When using a WWW browser, such as Netscape® by Netscape Corporation or Mosaic® by University of Illinois, a user typically uses a pointing device, such as a mouse, to select one of many hypertext links to request that an attached WWW server fetch more information. Generally, the user waits seconds, sometimes minutes, for this information to be downloaded. This waiting is an awful aspect of current web user experience. It is the number one human interface problem of the web, because the user can lose his or her concentration and thereby lose the value of interactive information retrieval. Waiting for minutes to retrieve data from a link is disruptive to the user and inhibits a steady work flow pattern. Since each selected link may only be one of many necessary segments of a longer search, a continuous and focused thought process by the user is important. Disruptions and long frustrating waits during such a search are the antithesis of a focused productive work pattern. Thus, there is a need to reduce the amount of waiting time from when a link is selected to when relevant data appears on the user's WWW browser.

There have been numerous methods proposed for reducing user wait time. The first strategy is to reduce the number of bits in a page or file. This is a common strategy used on the WWW. This strategy includes keeping pages small, having text-only/regraphics versions of WWW sites and reducing the size and/or color complexity of graphics of WWW sites. This first strategy trades content quality for timeliness of response. The second strategy is the session-oriented predictive prefetch. The strategy here is to guess what the user can and probably will fetch next and download it before the user requests it. Bellcore's STREAMS implements this strategy. Of course one should not guess unless it is necessary. If the user has enough time and bandwidth available to download all choices, this is a good strategy, but most users don't have that much time or bandwidth. Further, if the service provider charges per fetched item or for the time-bandwidth required to prefetch each item, this strategy becomes quite expensive. The third strategy is the user-oriented predictive pre-fetch. This strategy is to guess what content individual users will fetch and download it between sessions. Services can guess that all users will need certain content and download it between sessions. This strategy is somewhat useless for general use where there is no pattern from which to predict what information will be needed next. Some on-line services perform a version of this strategy. The fourth strategy is the streaming fetch and display strategy. This strategy arranges the order of fetched bits so that some content can be displayed before all of it arrives. Some WWW browsers, such as Netscape take advantage of this opportunity. This only helps reduce time if what the user is searching for is in the part that is displayed first.

Out of all the known strategies, only those having some type of prefetch can potentially reduce non-productive time between WWW information transfers.

It is an object of the present invention to provide content for immediate display to the information that is being fetched from the WWW while the information fetching is underway.

It is another object of the present invention to provide content for immediate display that is relevant to the information being fetched from the WWW.

SUMMARY OF THE INVENTION

Briefly stated, the foregoing objects are achieved by providing hypertext links which have content which is embedded therein but not displayed unless the hypertext link is activated. Upon activation, this embedded content, which is stored locally with the rest of the current WWW page or program, is immediately called forth and presented on a users display screen by means of a WWW browser. This embedded content is provided by the provider of the information that follows and is related in some manner to the information that follows, while that information is being downloaded from a remote server. In this manner, this download time, which would otherwise be empty time, is put to productive and mentally stimulating use.

In accordance with another aspect of the invention, the aforementioned objects are achieved by providing a method for using the downloading time between WWW pages, including the steps of embedding a conditionally displayed file within a hypertext link from the current WWW page to a next WWW page. Upon selection by a user of the hypertext link having the conditionally displayed file, the conditionally displayed file is displayed. The next WWW page, which was selected by activating the hypertext link, is fetched and the conditionally displayed file is displayed concurrently. Displaying the next WWW page after it has been fetched, thereby replacing the conditionally displayed file.

In accordance with another aspect of the invention, the aforementioned objects are achieved by providing a system running a WWW browser program and having an input/output interface connected to a WWW server. This system has a store for storing information and this information may include control instructions and data. A processor by instructions of the WWW browser program requests a first WWW page from the WWW server. The WWW server transmits the first WWW page to the input/output interface from whence the first WWW page is stored in the store. This first WWW page has a hypertext transfer protocol interactive link to a second WWW page stored in the server and conditionally displayed data associated with this second WWW page stored in the store with the first WWW page. A display screen displays the first WWW page according to the WWW browser. A pointing device for selecting a hypertext link to another WWW page next selects the hypertext link to the second WWW page. The selection of this hypertext link causes a request to be transmitted to the server to transfer the second WWW page. This selection also causes the processor to read the conditionally displayed data from the store and display this conditionally displayed data while the second WWW page is being received from the server.

DETAILED DESCRIPTION

Figure 1:
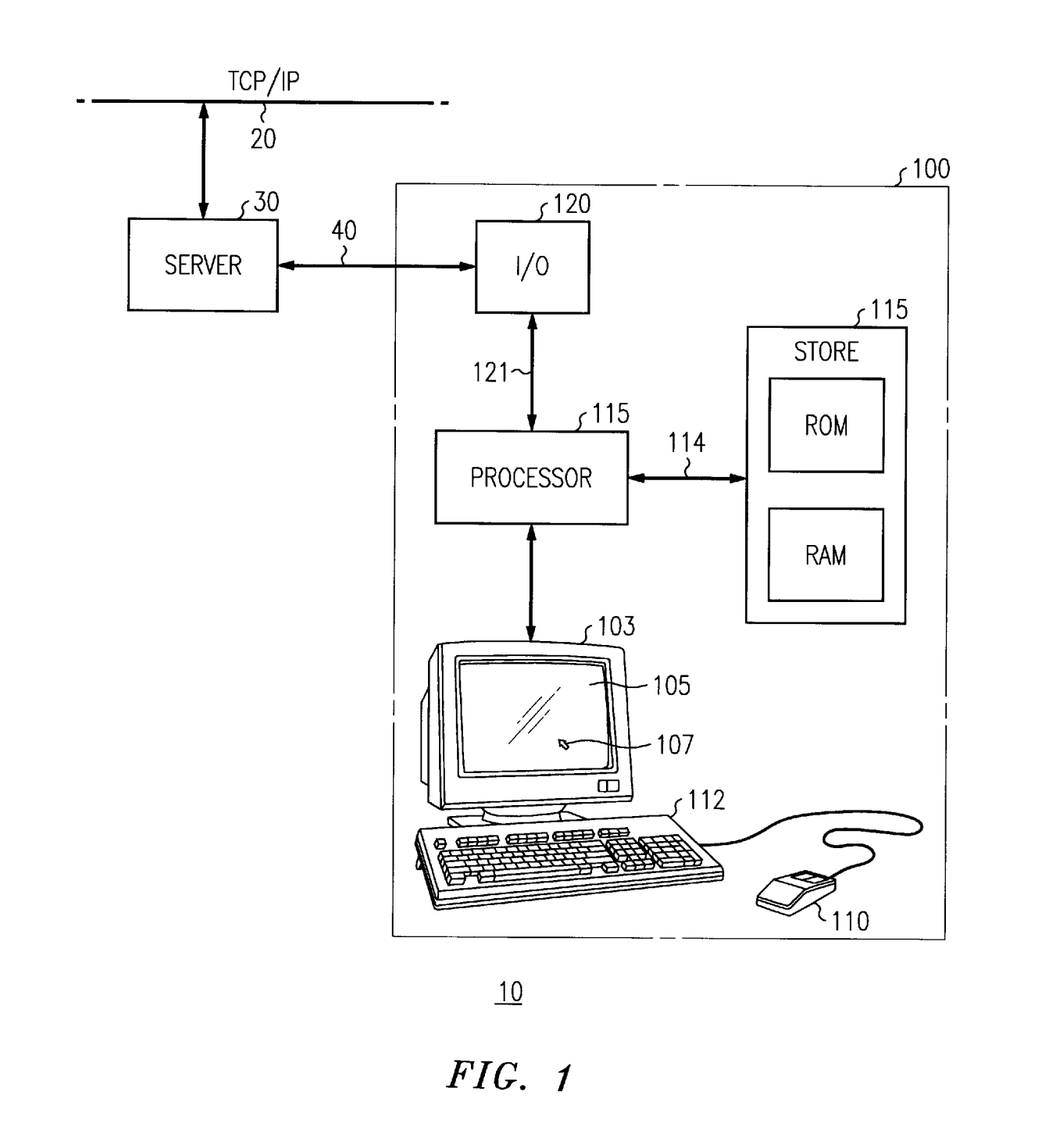
FIG. 1 is a diagram of a user-client and server connected to the World Wide Web.

Referring now to FIG. 1, an arrangement 10 used for delivery and presentation of WWW information is shown. Delivery of WWW information will be via TCP/IP conductor 20, except for any small amount that is authored locally. Server 30 is connected to conductor 20 as the connection point of arrangement 10 with the WWW. Server 30 is also attached to user system 100 by connection 40. Interaction with the user primarily takes place at user system 100.

User system 100 has a display 103, such as a VGA or SVGA type, and a screen 105. Preferably, screen 105 is capable of displaying color images fairly rapidly. System 100 has a pointing device 110, a mouse is shown but a track ball, joystick, etc. could be used, which controls the movements of a cursor 107 across screen 105. System 100 also has a keyboard 112 which is used by the user for entering alpha-numeric information and control keystroke sequences.

User system 100 also has a processor 113 that processes instructions and data to provide a graphical user interface to the WWW to the user. The graphical user interface used in the present invention is a modification of a WWW browser. The user uses pointing device 110 and keyboard 112 to interact with the WWW browser displayed on screen 105, as will be described later in regard to FIG. 2. System 100 further has a store 115 which has read only memory and random access memory therein, for storing instructions and data used by the processor 113. Store 115 is connected to processor 113 via processor memory bus 114. Also, system 100 has an input/output unit 120 which is shown connected to the processor 113 by a peripheral bus 121. The input/output unit 120 communicates with server 30 under the control of processor 113 and user interactions with the WWW browser. The connections of separate processor-memory bus and peripheral bus to processor is shown as one example of a user system architecture, the present invention would work just as well with other system architectures such as the architecture that has a single bus connecting the processor, store and peripherals.

Figure 2:
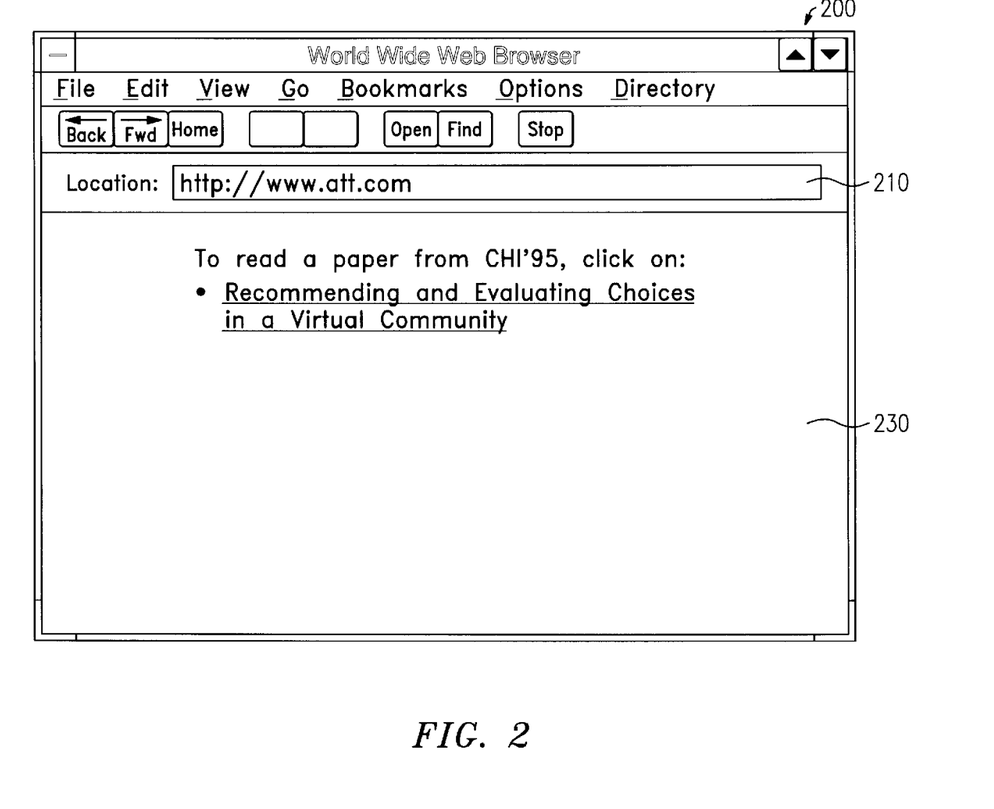
FIG. 2 is a diagram of a WWW browser user interface on a display screen showing a WWW page having many hypertext links.

Referring now to FIG. 2, a generic WWW Browser 200 is shown. The location active region 210 is where the URLs appear. URLs may be typed into region 210. If a URL has been stored by the WWW browser 200 for later retrieval, then such URL may be entered into the location region 210 through one or more clicks of the pointing device 110. Presently, the user system 100 is downloading information from the AT&T Corp. home page. Below the location region 210 is a row of interactive buttons 220 which help navigate the WWW and below the row of interactive buttons 220 is the active window 230 of the WWW Browser 200. Active window 230 is where hypertext markup language files are displayed. Most hypertext markup language files have interactive regions, usually highlighted and/or underlined text or graphics, which if selected send a request to an attached server 30 for a next html file of information. This is the selection of a hyperlink or simply link, and the html file is often a page of information which has a unique URL.

There are user system aspects and server aspects to the present invention. On the user system side, the invention has a graphical user interface process that uses the extra content inside hyperlinks. On the server side, the invention has a network communications process that maintains at a server site appropriate extra content inside the hyperlinks.

Hyperlinks that contain and display content when selected by clicking or similar action, are called content laden links or CL links. The content embedded in such CL hyperlinks may consist of previews, outlines, introductions, sets of instructions, advertisements, in short anything that makes sense for unpredictable brief download times. The embedded content could be data (e.g. html) or a program (e.g. java).

For example, here is a small example of html source code from the home page shown in FIG. 2. This source code contains a hyperlink to a paper entitled "Recommending And Evaluating Choices in a Virtual Community" residing in file named "videos.html".

---

To read a paper from CHI'95, click on:<A HREF="videos.html">
Recommending And Evaluating Choices In A Virtual Community</A>

---

The hyperlink is the text of form:<A . . . > . . . </A>. This hyperlink can be made into a CL hyperlink by embedding content in the link itself, such as:

---

Recommending And Evaluating Choices In A Virtual Community</A>

To read a paper from CHI'95, click on:<A HREF="videos.html"
CLTYPE="html"
CL="<BODY>The paper that is downloading now contains sections:
<UL>
<LI>Introduction
<LI>Interface Design Goals
<LI>Internet Concept Trial
<LI>Algorithms
<LI>Results
</UL>
</BODY>
"
>

---

In the above CL link, the hypertext link contains two data fields, CLTYPE and CL. The CLTYPE field specifies the resource-type of the embedded content, in this case, html. The embedded content itself sits in the CL field. In this case the embedded content is the top level outline of the paper, which is displayed in active window 230 while the paper is being downloaded from the server 30.

When a user selects (e.g. clicks on) hyperlinks enriched with embedded content, the applications caused this extra content to be displayed in window 230 very quickly before issuing a normal server request. Thus, using CL links, users never have to wait for some content. Near instant speed is always achievable because the moment a user clicks on a link, the extra content is resident in local memory since the page or program that contains the selected hyperlink and the extra content are resident in local memory also.

Figure 3:
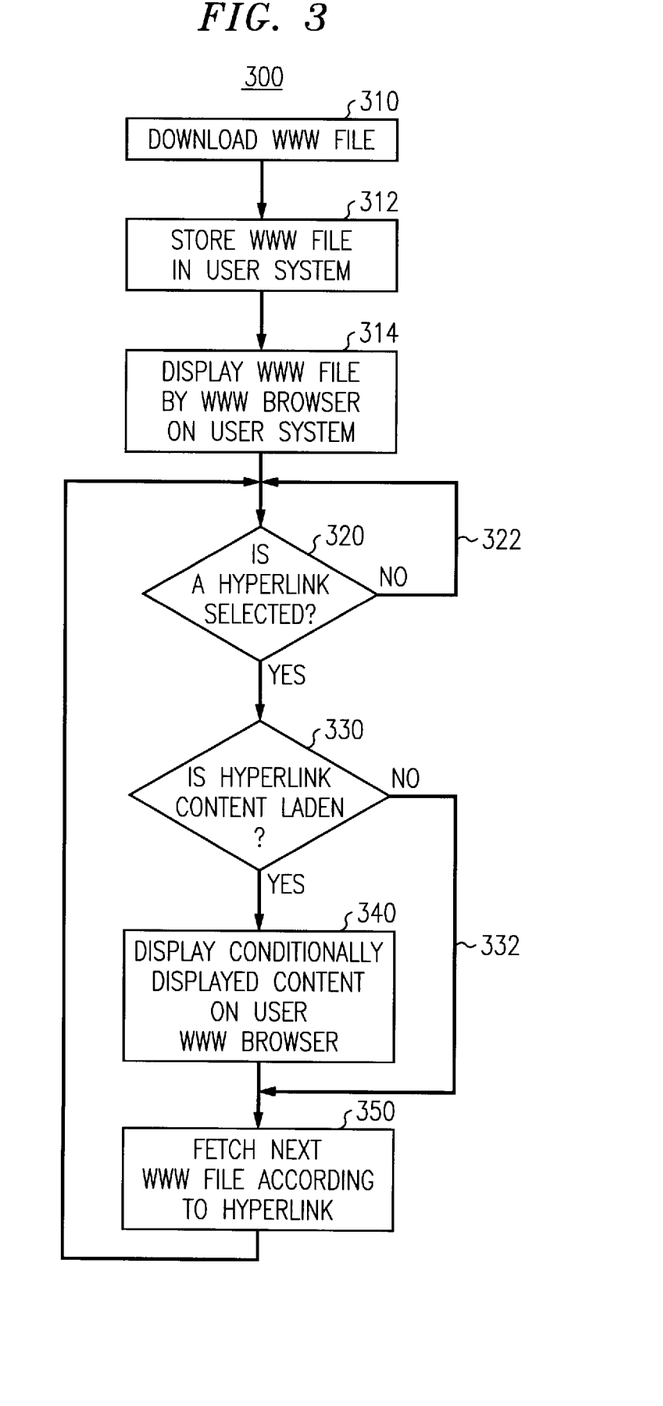
FIG. 3 is a flow diagram for the selection of a content laden link and the display of such content.

Referring now to FIG. 3, a method 300 for displaying conditionally displayed content of a content laden hyperlink is shown. Method 300 begins with step 310. Step 310 is the downloading of a WWW file, for example html code of a WWW page that was selected according to some type of user input. Next, step 312 locally stores the WWW file downloaded in previous step 310 locally in system 100 (shown in FIG. 1). After storage, step 314 displays the WWW file by operation of the system 100 under the control of the WWW browser application. The displayed WWW file may contain hyperlinks that are typically highlighted and/or underlined to indicate that they are interactive regions. Some of these hyperlinks have embedded conditionally displayed content. Next, step 320 regularly tests to determine if a hyperlink has been selected. If no hyperlink has been selected, this step self loops and tests again. This gives the display a static appearance. If a hyperlink has been selected, method 300 progresses to step 330. Step 330 tests to see if the selected hyperlink has embedded conditionally displayed content. If there is conditionally displayed content, the content is fetched from local storage and displayed almost immediately for the user to view as the WWW file associated with the selected hyperlink is accessed and continues to step 350. If the selected hyperlink does not contain conditionally displayed content, the method 300 continues to step 350. At step 350 the WWW file associated with the selected hyperlink is detched and the display of step 330 or 340 is replaced with the graphic and text information of the fetched WWW file. At this point, method 300 will loop back to step 320 and wait for selection of a hyperlink from the present display unless the user terminates the method 300 by closing out operation of the WWW browser or some similar action not shown in FIG. 3.

Figure 6:
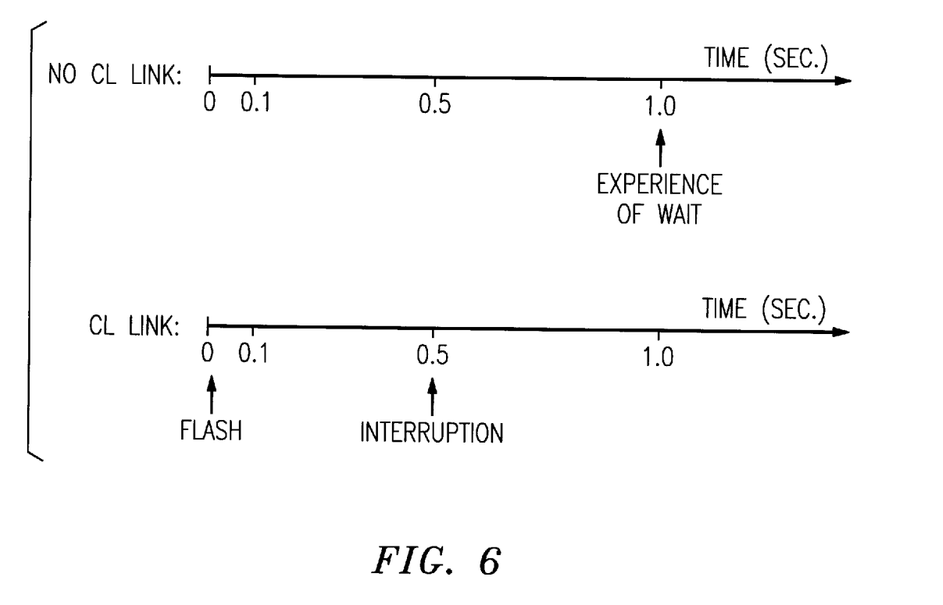
FIG. 6 illustrates average user perceptions of waiting with and without a content laden link.

There may be, however, a problem of too quick a response on the WWW can have. Unpredictably brief display times such as shown in the bottom timeline of FIG. 6, pose human interface problems. This may arise in a user's experience immediately after clicking on a CL link, depending upon how long the coming fetch takes to complete. If the data fetched by selecting an embedded content hyperlink is returned too fast, the brief display of the conditionally displayed content will be perceived by the user as only an incomprehensible flash. Slightly longer displays of conditionally displayed content are comprehensible, but the user is annoyingly interrupted before completing his or her reading of the content displayed. To prevent this, a timing program that gives the conditionally displayed content a minimum amount of view time, for example 4 seconds, before being replaced by the selected next page or file.

Figure 4:
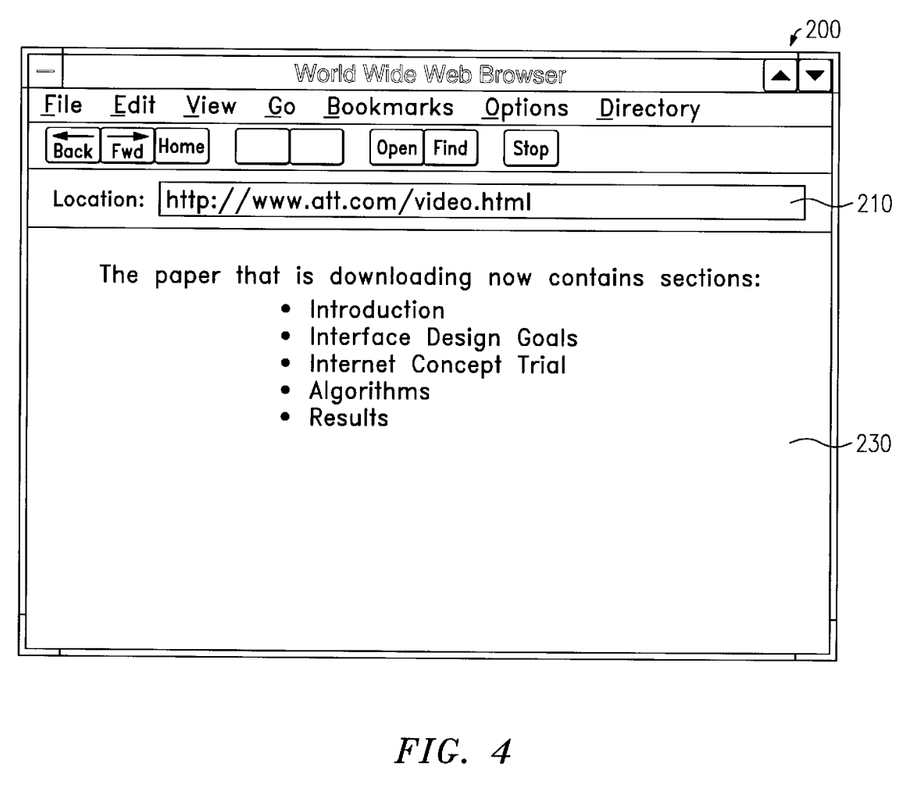
FIG. 4 is a diagram of a WWW browser user interface illustrating the display of content of a content laden link after such a selection.
Figure 5:
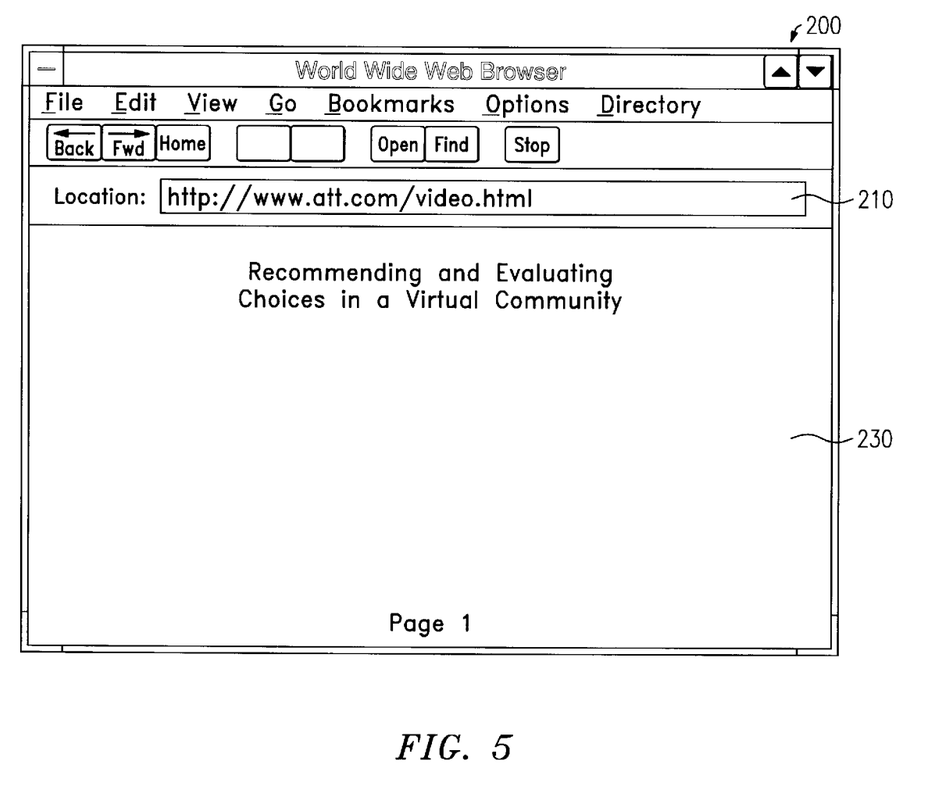
FIG. 5 is a diagram of a WWW browser user interface on a display screen showing the initial page of the selected article.

In the example presented above, when a user selects the CL link, the application processes the hyperlink observing that the data fields CLTYPE and CL exist and have values. Before issuing the normal request for the "videos.html" file, the WWW browser 200 displays the html source residing in the CL field. In window 230, the user sees something like:

The paper that is downloading now contains sections:
Introduction
Interface Design Goals
Internet Concept Trial
Algorithms
Results This is shown in FIG. 4 as it would appear on WWW browser 200. As data, especially html data, begins to be received from the location accessed by the selected hyperlink, FIG. 4 begins to change into FIG. 5.

While a user never waits for some content after selecting a hyperlink, there is some waiting involved, because the user must wait for the link-embedded content to download as part of the present html page. Thus, the wait occurs during the previous download rather than during the current download. However, after the initial loading of a first page with CL links, the wait for the download of the next will be less noticeable because the user is interacting with content from the previous CL link that is relevant to hyperlink selection.

In Operation

In general link-embeddable content will be written by the authors of the resource at the far end of the hyperlink, i.e., the authors of the material fetched when the link is selected (e.g. clicked). Though there is no reason why these authors must necessarily write the content, for the following reasons it is better if they do, and it shall be assumed that they do, with one notable exception.

Outlines, Tables of Contents, Public and/or Legal Notices are best written and managed by the authors.

Revisions of the Underlying Information may make it desirable to revise the embedded content in the CL links, this is best performed by the authors.

Advertisements can be added by anyone, including the authors.

Preferably authors will make link-embeddable content available to the world as files on the authors' home sites. The content is then available for insertion into hypertext links on other pages maintained by other people and organizations at other sites. Preferably a file naming convention such as the one below will be used. The file naming convention specifies that for any fetchable resource named:

<resource-filename> available link-embeddable content files will be named:

<resource-filename>.CL.<size>

So, for example, link-embeddable content for a java program accessible at:

http://www.biz.com/pro/fun.java might be available in three files:

http://www.biz.com/pro/fun.java.CL.200b
http://www.biz.com/pro/fun.java.CL.1kb
http://www.biz.com/pro/fun.java.CL.5kb The size extension on the end of .CL files exists so that maintainers of other web sites who plan to embed this content inside their own resource hyperlinks to www.biz.com can choose how much link-embeddable content to embed from the alternatives provided.

These conventions allow "linked-to" content providers to create and provide link-embeddable content, but allows "linked-from" content providers to determine how much of that available content to choose, embed and maintain in their own pages and programs.

In each .CL file, the first line specifies the type of content resource. The rest of the file specifies the content itself.

To maintain CL links on a set of pages, a web site administrator runs a program on those pages that periodically follows outgoing links looking for corresponding .CL files. If the .CL files are found, the program rewrites the page to add content to the links so that the embedded content will be available in memory when the user clicks the link.

Thus, it will now be understood that there has been disclosed an method and apparatus for displaying a software system. While the invention has been particularly illustrated and described with reference to preferred embodiments thereof, it will be understood by those skilled in the art that various changes in form, details, and applications may be made therein. It is accordingly intended that the appended claims shall cover all such changes in form, details and applications which do not depart from the true spirit and scope of the invention.

What is claimed is:

1. A method for providing a WWW page that uses the downloading time between a current WWW page and a next WWW page, comprising the steps of:

fetching conditionally displayed data associated with hypertext link-embeddable content;

embedding the conditionally displayed data within a hypertext link from the current WWW page to a next WWW page to provide a content laden hypertext link;

transmitting the current WWW page to a user so that the current WWW page is displayed in a first window in a user's WWW browser;

whereby upon selection by the user of a hypertext link, the user's browser determines whether the selected hypertext link is content laden, and if the selected hypertext link is content laden, the user's browser displays the conditionally displayed data in said first window in place of said current WWW page, and requests the next WWW page.

2. The method of claim 1, wherein the conditionally displayed data is a hypertext markup language file.

3. The method of claim 1 wherein the conditionally displayed data is descriptive of the selected next WWW page.

4. The method of claim 1 wherein the conditionally displayed data contains graphics data.

5. The method of claim 1 wherein the conditionally displayed data contains sound data.

6. The method of claim 1 wherein the conditionally displayed data contains text.

7. The method of claim 1 wherein the conditionally displayed data contains a program file.

8. The method of claim 1 wherein the conditionally displayed data contains a java program file.

9. The method of claim 1, wherein the conditionally displayed data contains an advertisement.

10. The method of claim 9, wherein the advertisement is related in subject matter to the selected next WWW page.

11. The method of claim 1, wherein the conditionally displayed data is displayed for at least a minimum amount of time before the selected next WWW page is displayed.

12. A system running a WWW browser program and having an input/output interface connected to a WWW server, said system comprising:

a store for storing information, said information including control instructions and data;

a processor that, by instructions of said WWW browser, requests a first WWW page from said WWW server;

said WWW server transmitting said first WWW page to said input/output interface from whence said first WWW page is stored in said store;

said first WWW page having a hypertext transfer protocol interactive link to a second WWW page stored in said server and conditionally displayed data associated with said second WWW page stored in said store with said first WWW page to provide a content laden hypertext link;

a display screen displaying said first WWW page according to said WWW browser;

a pointing device for selecting a hypertext link to another WWW page selecting said hypertext link to said second WWW page, said selecting causing a request to be transmitted to said server to transfer said second WWW page; and said selection also causing said processor to determine whether the selected hypertext link is content laden, and if the selected hypertext link is content laden, causing said processor to read said conditionally displayed data from said store and display said conditionally displayed data in place of said first WWW page while the second WWW page is being received from said server.

13. The system of claim 12, wherein the conditionally displayed data is part of a hypertext markup language file.

14. The system of claim 12 wherein the conditionally displayed data is descriptive of the second WWW page.

15. The system of claim 12 wherein the conditionally displayed data contains graphics data.

16. The system of claim 12 wherein the conditionally displayed data contains sound data that is aurally displayed.

17. The system of claim 12 wherein the conditionally displayed data contains text.

18. The system of claim 12, wherein the conditionally displayed data contains an advertisement.

19. The system of claim 18, wherein the advertisement is related in subject matter to the second WWW page.

20. The system of claim 12, wherein the conditionally displayed data is displayed for at least a minimum amount of time before the second WWW page is displayed.

21. A method for providing a WWW page that uses the downloading time between a current WWW page and a next WWW page, comprising the steps of:

fetching a conditionally displayed file associated with hypertext link-embeddable content;

embedding the conditionally displayed file within a hypertext link from the current WWW page to a next WWW page to provide a content laden hypertext link;

whereby upon selection by a user of a hypertext link, the user's browser determines whether the selected hypertext link is content laden, and if the selected link is content laden, the user's browser displays the conditionally displayed file in place of said currently displayed WWW page.

22. The method of claim 21, wherein said server selects one of a plurality of conditionally displayed files to be embedded within another hypertext link within said next WWW page before the fetching thereof.

23. The method of claim 21, wherein the conditionally displayed file is provided by a provider of the next WWW page.

24. The method of claim 21, wherein multiple versions of the conditionally displayed file are provided by the provider of the next WWW page and the provider of the currently displayed WWW page selects which version is to be embedded within the respective hypertext link of the currently displayed WWW page.

25. A method for using the downloading time between WWW pages, comprising the steps of:

embedding conditionally displayed data within a hypertext link from a current WWW page to a next WWW page to provide a content laden hypertext link;

displaying the current WWW page in a first window;

upon selection by a user of a hypertext link, determining whether the selected hypertext link is content laden and, if the selected hypertext link is content laden, displaying the conditionally displayed data in said first window in place of said current WWW page, fetching the next WWW page that was selected by activating the hypertext link; and displaying the next WWW page in said first window, thereby supplanting the conditionally displayed data.

26. The method of claim 25, wherein the conditionally displayed data is a hypertext markup language file.

27. The method of claim 25, wherein the conditionally displayed data is descriptive of the selected next WWW page.

28. The method of claim 25, wherein the conditionally displayed data contains graphics data.

29. The method of claim 25, wherein the conditionally displayed data contains sound data.

30. The method of claim 25, wherein the conditionally displayed data contains text.

31. The method of claim 25, wherein the conditionally displayed data contains a program file.

32. The method of claim 25, wherein the conditionally displayed data contains a java program file.

33. The method of claim 25, wherein the conditionally displayed data contains an advertisement.

34. The method of claim 25, wherein the conditionally displayed data is related in subject matter to the selected next WWW page.

35. The method of claim 25, wherein the conditionally displayed data is displayed for at least a minimum amount of time before the selected next WWW page is displayed.

36. A method for using the downloading time between WWW pages, comprising the steps of:

embedding within a currently displayed WWW page, a conditionally displayed file within a hypertext link from the current WWW page to a next WWW page to provide a content laden hypertext link;

upon selection by a user of the hypertext link, determining whether the selected hypertext link is content laden, and if the selected hypertext link is content laden, displaying the conditionally displayed file in place of said currently displayed WWW page, fetching the next WWW page that was selected by activating the hypertext link from a connected WWW server; and displaying the next WWW page, thereby supplanting the conditionally displayed file.

37. The method of claim 36, wherein said server selects one of a plurality of conditionally displayed files to be embedded within another hypertext link within said next WWW page before the fetching thereof.

38. The method of claim 36, wherein the conditionally displayed file is provided by a provider of the next WWW page.

39. The method of claim 36, wherein multiple versions of the conditionally displayed file are provided by the provider of the next WWW page and the provider of the currently displayed WWW page selects which version is to be embedded within the respective hypertext link of the currently displayed WWW page.

* * * * *